(12) United States Patent
Bai et al.

(10) Patent No.: US 11,396,621 B1
(45) Date of Patent: Jul. 26, 2022

(54) PRESSURE-BEARING PLUGGING COMPOSITION, PRESSURE-BEARING PLUGGING SLURRY AND PREPARATION METHOD AND USE THEREOF

(71) Applicant: Southwest Petroleum University, Chengdu (CN)

(72) Inventors: Yang Bai, Chengdu (CN); Lingfeng Wu, Chengdu (CN); Pingya Luo, Chengdu (CN); Jinsheng Sun, Qingdao Shandong (CN); Haibo Liang, Chengdu (CN); Wen Xu, Chengdu (CN); Kesheng Rong, Chengdu (CN); Jing Zhang, Chengdu (CN); Gang Xie, Chengdu (CN); Jiading Deng, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/511,400

(22) Filed: Oct. 26, 2021

(30) Foreign Application Priority Data

Feb. 22, 2021 (CN) .......................... 202110198750.4

(51) Int. Cl.
  *C09K 8/516* (2006.01)
  *C09K 8/504* (2006.01)
  *E21B 33/12* (2006.01)
  *C09K 8/508* (2006.01)

(52) U.S. Cl.
  CPC ............ *C09K 8/5045* (2013.01); *C09K 8/508* (2013.01); *C09K 8/516* (2013.01); *E21B 33/1208* (2013.01); *C09K 2208/18* (2013.01)

(58) Field of Classification Search
  None
  See application file for complete search history.

(56) References Cited

U.S. PATENT DOCUMENTS

| 2008/0230223 | A1* | 9/2008 | McCrary | C09D 7/62 166/272.2 |
| 2010/0193244 | A1* | 8/2010 | Hoskins | E21B 21/003 175/5 |
| 2011/0214862 | A1* | 9/2011 | Horton | C09K 8/42 166/283 |
| 2017/0051200 | A1* | 2/2017 | Elhard | C09K 8/805 |

* cited by examiner

*Primary Examiner* — Andrew Sue-Ako
(74) *Attorney, Agent, or Firm* — Calfee Halter & Griswold LLP

(57) ABSTRACT

The present discloses a pressure-bearing plugging composition comprising 1-7 parts by weight bentonite, 0.1-1.5 parts by weight deformation material, 8-18 parts by weight filling material and 4-12 parts by weight modified bridging material, based on 100 parts by weight of water; the modified bridging material comprises a core, and a coating layer coated on an outer surface of the core, and a paraffin layer disposed between the core and the coating layer; the core is made of a water-absorbing material, and the coating layer is formed by bonding rigid particles and an adhesive.

12 Claims, No Drawings

PRESSURE-BEARING PLUGGING COMPOSITION, PRESSURE-BEARING PLUGGING SLURRY AND PREPARATION METHOD AND USE THEREOF

PRIORITY CLAIM & CROSS REFERENCE

The application claims priority to Chinese Application No. 202110198750.4, filed on Feb. 22, 2021, entitled "pressure-bearing plugging composition, pressure-bearing plugging slurry and preparation method and use thereof", which is herein specifically and entirely incorporated by reference.

FIELD

The present disclosure relates to the technical field of plugging with regard to drilling fluid, in particular to a pressure-bearing plugging composition, a pressure-bearing plugging slurry, and a preparation method and a use thereof.

BACKGROUND

When the well-drilling construction is carried out in regard to the abnormal high-temperature and high-pressure reservoir stratum, the development of natural cracks and holes of the stratum causes that a large amount of drilling fluid is prone to leak in the drilling process, thus the drilling period is significantly increased, it results in a huge economic loss. The bridging plugging is the most widely applied plugging technology at present, in order to solve the difficult problem of low bearing capacity of stratum, it mainly refers to that the inert materials having various shapes and sizes are mixed in a drilling fluid system according to a certain proportion, and the mixture was injected into a leakage layer and segment for plugging.

At present, the conventional bridging particles mainly comprise rigid particles (such as walnut shell) and fiber materials (e.g., sawdust, bagasse). The fiber material can form a plugging layer under certain conditions, but it is easy to lose efficacy under high pressure conditions; the rigid particles have the characteristics of high bearing capacity and low deformation tendency, and have desirable application effect, but the conventional rigid materials are prone to form a carbonization phenomenon under the high-temperature condition, so that the strength is greatly reduced, the compressive strength of a plugging layer is lowered accordingly, such that an effective plugging cannot be carried out, and the well leakage cannot be prevented, thereby causing serious damage of the reservoir layer.

Given that the well drilling operations have gradually extended to deep layers, ultra-deep layers, deep water and complex strata, the problem of pressure-bearing and plugging of cracked strata is encountered in many areas during the well drilling process at home and abroad. When a high-pressure layer, a salt-gypsum layer or an easily collapsed stratum exists underneath the cracked stratum, the pressure bearing capacity of the cracked stratum needs to be significantly improved in order to ensure safe and efficient well-drilling operation. However, the conventional bridging and plugging theory and technology cannot comprehensively and effectively guide the research and development of a pressure-bearing plugging technology and the site operation, so that the site operation has the disadvantages of serious blindness, long time period and poor effect.

Therefore, the research and development of a pressure-bearing plugging slurry has become a problem to be solved urgently at the present stage.

SUMMARY

The present disclosure aims to overcome the problems of poor leakage stoppage effect in the site operation of the conventional bridging and plugging technologies, and the low primary leakage stoppage success rate of the pressure-bearing plugging slurry in a secondary crack development stratum and vicious cycle problems of "leakage after the plugging operation, and further plugging is required after the leakage", and provides a pressure-bearing plugging composition, a pressure-bearing plugging slurry, a preparation method and an application thereof, the plugging filling layer formed by the pressure-bearing plugging slurry in the plugging stage can improve the pressure-bearing capacity of the stratum.

In order to fulfill the above object, a first aspect of the present disclosure provides a pressure-bearing plugging composition, wherein the composition comprises bentonite, a deformation material, a filling material, a modified bridging material and water, wherein the bentonite is contained in an amount of 1-7 parts by weight, the deformation material is contained in an amount of 0.1-1.5 parts by weight, the filling material is contained in an amount of 8-18 parts by weight, and the modified bridging material is contained in an amount of 4-12 parts by weight, based on 100 parts by weight of water;

wherein the modified bridging material comprises a core, and a coating layer coated on an outer surface of the core, and a paraffin layer disposed between the core and the coating layer;

wherein the core is made of a water-absorbing material, and the coating layer is formed by bonding rigid particles and an adhesive.

A second aspect of the present disclosure provides a pressure-bearing plugging slurry prepared with the aforementioned pressure-bearing plugging composition.

A third aspect of the present disclosure provides a method for preparing the aforementioned pressure-bearing plugging slurry, wherein bentonite, deformation material, filling material and modified bridging material are sequentially contacted with water under the stirring conditions.

A fourth aspect of the present disclosure provides a use of the aforementioned pressure-bearing plugging slurry in the well-drilling construction operations for the stratum containing development of the secondary cracks.

Through the above technical schemes, the pressure-bearing plugging slurry provided by the present disclosure has the beneficial effects as follows:

The pressure-bearing plugging slurry of the present disclosure causes mutual synergy of the deformation material, the filling material and the modified bridging material, it can, during the plugging operation, form a compact filling layer on the surface of a crack on one hand, and on the other hand, realize the complete filling in the internal space of the crack, so as to effectively and completely fill the internal space of the crack, eliminate the pressure difference between the stratum and the internal space of the crack, such that the leakage plugging failure caused by the formation of secondary cracks after the plugging operation is effectively avoided.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a pressure-bearing plugging composition, wherein the composition comprises bentonite, a deformation material, a filling material, a modified bridging material and water, wherein the bentonite is contained in an amount of 1-7 parts by weight, the deformation material is contained in an amount of 0.1-1.5 parts by weight, the filling material is contained in an amount of 8-18 parts by weight, and the modified bridging material is contained in an amount of 4-12 parts by weight, based on 100 parts by weight of water;

wherein the modified bridging material comprises a core, and a coating layer coated on an outer surface of the core, and a paraffin layer disposed between the core and the coating layer;

wherein the core is made of a water-absorbing material, and the coating layer is formed by bonding rigid particles and an adhesive.

The inventors of the present disclosure have discovered that if the pressure-bearing plugging slurry is prepared by using the deformation material, the filling material and the modified bridging material according to the specific components and the matching ration of specific content, the pressure-bearing plugging slurry not only can form a compact filling layer on the surface of a crack, but also can completely fill an inner space of a secondary crack development stratum, eliminate the pressure difference between the stratum and the inner space of the crack, thereby effectively avoiding an occurrence of the situation involving with the plugging failure due to the formation of secondary cracks after the plugging operation.

The inventors of the present disclosure further discover that the modified bridging material plays the roles of bridging and filling in the pressure-bearing plugging, specifically, after the modified bridging material enters the interior of a crack, because the temperature of the stratum crack is high, a paraffin layer in the modified bridging material melts, a cavity is formed between a coating layer and a core, a coating layer of a part of the modified bridging material disintegrates inwards under the action of ground stress, a water-absorbing material (e.g., gel particles) acting as the core is exposed and contacts with external water (including water in the drilling fluid and the stratum water), the gel swells and deforms after absorbing the water, so that the internal space of the crack is filled. In addition, the swelled gel coats the filling material to form a new mixture, the structural strength of the new mixture is high under the traction and connection effects of the deformed material fiber, the requirements of both the ductility and the strength are met, the ductility enables the mixture to fill the crack space, the strength causes that the mixture is not prone to fracture and separate; the other part of modified bridging material plays a role in bridging rigid particles in the crack because the coating layer does not disintegrate or is not disintegrated completely, wherein the modified bridging material contains the coating layer which is partially disintegrated, the free water at the outside enters into the material through the disintegrated crack site on the coating layer, so that the gel serving as the core swells to support the coating layer, the structural strength of the material as a whole is further enhanced.

According to the present disclosure, it is preferable that the bentonite is contained in an amount of 2-6 parts by weight, the deformation material is contained in an amount of 0.1-1 parts by weight, the filling material is contained in an amount of 10-16 parts by weight, and the modified bridging material is contained in an amount of 6-10 parts by weight, based on 100 parts by weight of water.

According to the present disclosure, it is more preferable that the bentonite is contained in an amount of 3-6 parts by weight, the deformation material is contained in an amount of 0.4-0.6 parts by weight, the filling material is contained in an amount of 12-14 parts by weight, and the modified bridging material is contained in an amount of 7-10 parts by weight, based on 100 parts by weight of water.

According to the present disclosure, when the pressure-bearing plugging slurry is prepared with the specific components and the matched ratio of the specific content, the plugging filling layer formed by the pressure-bearing plugging slurry in the leaking stoppage stage has high strength, so that the pressure-bearing capacity of the stratum can be improved.

According to the present disclosure, the method of preparing the modified bridge material comprises:

(1) subjecting the water-absorbing material to a spheroidization process to obtain a core;

(2) coating at least a part of an outer surface of the core with paraffin to obtain a paraffin layer;

(3) adhering a bonded mixed powder to at least a part of an outer surface of the paraffin layer and subjecting to the baking treatment, wherein the bonded mixed powder comprises rigid particles and an adhesive, so as to obtain the modified bridging material.

According to the present disclosure, the conditions of a spheroidization process in the step (1) includes: subjecting to a crushing process by a crusher so as to produce spheres; specifically, the water-absorbing material is crushed into spheres by a crusher, the spheres are then sieved to obtain a core with a desirable particle size.

According to the present disclosure, the coating process in the step (2) comprises: one or more selected from the group consisting of spraying, pouring, brushing, leaching and sprinkling; preferably, pouring is adopted; specifically, melting the paraffin and coating the melted paraffin on at least a part of an outer surface of the core obtained in the step (1). Preferably, the coating rate is 80-100%, and more preferably, the coating rate is 100%.

According to the present disclosure, in the step (3), the rigid particles and the adhesive are blended to obtain a bonded mixed powder, the bonded mixed powder is adhered to at least a part of an outer surface of the paraffin layer, the bonded mixed powder is baked to obtain the modified bridging material. Specifically, uniformly scattering the bonded mixed powder consisting of rigid particles and an adhesive on a tray, then placing the spheres of the core coated with paraffin on the outer surface obtained in the step (2) on the tray and rolling to enable the bonded mixed powder to be adhered on the surfaces of the spheres, and then baking the spheres for 4-6 h, preferably 5-6 h, in an oven at the temperature of 30-40° C., preferably 35-36° C., wherein the baking serves to solidify the coating layer, the baking temperature shall not be excessively high, and a low-temperature and long-time mode is adopted to prevent the paraffin from being melted.

According to the present disclosure, the core has a particle size within a range of 1-5 mm, the paraffin layer has a thickness of 0.1-0.6 mm, and the coating layer has a thickness of 1.9-4.4 mm; preferably, the core has a particle size within a range of 2-4 mm, the paraffin layer has a thickness of 0.2-0.4 mm, and the coating layer has a thickness of 2.8-3.6 mm. In the present disclosure, the particle size of the core, the thickness of the paraffin layer and the thickness of the coating layer are limited within the aforesaid ranges, so that the method has the advantage that the synergistic bridging and blocking effect of the rigid shell and the flexible core in the modified bridging material is exerted to the greatest extent under the conditions of stratum temperature and crack opening degree (crack width, or crack opening degree, or opening), which refers to the distance between crack walls).

According to the present disclosure, the particle size of the modified bridging material is within a range of 3-10 mm, preferably 5-8 mm.

According to the present disclosure, the water-absorbing material is rubber and/or gel; preferably, the water-absorbing material is intelligent gel ZND-2, wherein the intelligent gel ZND-2 is polymer leaking stoppage gel, its molecular chains are of a spatial net structure, and the polymer leaking stoppage gel has strong capacities of leaking stoppage or plugging assistance and air isolation in a leakage channel. The gel plugging agent ZND-2 is a water-soluble high-molecular polymer type plugging gel synthesized by introducing a special functional group on a macromolecular chain, and can automatically stop flowing after entering a leaking layer so as to form a reversible non-chemical cross-linked space mesh gel structure; such a structure fills the leaked cracks or cavern spaces to form a "gel segment plug" that can isolate the fluids in the stratum from the fluids in the wellbore. When the lowest pressure difference required for movement of the "gel segment plug" is larger than the pressure difference between the drilling fluid column pressure and the stratum fluid pressure, the purpose of plugging can be achieved. In the present disclosure, the intelligent gel ZND-2 is dry powder and chemically pure, it is produced by the Sichuan Guangya Polymer Chemical Co., Ltd.

According to the present disclosure, the paraffin is 58° C. fully-refined granular paraffin, the specification is No. 58, the melting point is 58° C., the oil content is 0.5%, and the paraffin is white, odorless and tasteless granular solid at normal temperature, the paraffin refers to a product obtained by taking oil-containing wax as a raw material, subjecting to sweating or solvent deoiling, and then subjecting to carclazyte or hydrogenation refining. The paraffin has high melting point, low oil content, it does not cement, has not sweating and greasiness feeling at normal temperature, and it has desirable water resistance, moisture resistance and electrical insulation property. In the present disclosure, the fully refined paraffin is manufactured by the Fushun Petrochemical Branch Company of the PetroChina Company Limited.

According to the present disclosure, the rigid particles are one or more selected from the group consisting of limestone, walnut shell, quartz sand, calcite and sawdust; preferably, the rigid particles are made of limestone; more preferably, the limestone has a particle size within a range of 0.5-0.9 μm. In the present disclosure, the walnut shell refer to walnut shell abrasive materials, each of the limestone, walnut shell, quartz sand, calcite and sawdust can be used for wellbore plugging, and can be processed into products with different particle sizes according to actual requirements, and in the present disclosure, the particle size of the rigid particles is within a range of 0.5-0.9 μm.

In addition, limestone is mainly composed of calcium carbonate ($CaCO_3$). The quartz sand is quartz particles formed by crushing and processing the quartz stones. Quartz is a nonmetallic mineral, and is a silicate mineral with hardness, wear resistance and stable chemical properties. The quartz sand is milky white or colorless and semitransparent, has a Mohs hardness of 7, and comprises $SiO_2$. Calcite is a calcium carbonate mineral, which is a widely distributed mineral. The calcite has various crystal shapes, and the aggregate thereof may be a cluster of crystals, and may be in the form of granules, blocks, fibers, stalactic shape, earthy shape, or the like. A plurality of square fragments can be obtained by knocking the calcite, so that it is named as the calcite. The sawdust is powder-shaped sawdust of trees scattered from cutting the trees during the wood processing. Wood processing, which is a process using wood as a raw material, mainly by mechanical or chemical means, the product of which still retains the basic properties of wood.

According to the present disclosure, the adhesive is one or more selected from the group consisting of epoxy resin, phenolic resin, unsaturated polyester and polyurethane, preferably epoxy resin. In addition, it shall be noted that the epoxy resin is a high molecular polymer with the molecular formula $(C_{11}H_{12}O_3)_n$, which refers to the generic term of a polymer containing two or more epoxy groups in the molecule. It is a polycondensation product of epichlorohydrin and bisphenol A or a polyol.

According to the present disclosure, the deformation material is a fiber, and the fiber is one or more selected from the group consisting of short-fiber sepiolite fiber, polypropylene short fiber and modified plant fiber.

The length of the fiber is within a range of 10-20 mm, and the width of the fiber is within a range of 1-5 mm; preferably, the fiber has a length of 12-18 mm and a width of 2-4 mm; more preferably, the fiber has a length of 14-16 mm and a width of 2-4 mm; further more preferably, the fiber has a length of 15 mm and a width of 3 mm.

According to the present disclosure, the length to width ratio of the fiber is (2-20):1, preferably (3-9):1, more preferably (3.5-8):1, more preferably 5:1.

In the present disclosure, the fibers mainly play a role of traction and connection in the pressure-bearing plugging slurry, and in order to balance the dispersion performance and the traction connection performance in the pressure-bearing plugging slurry, the aforesaid specific length and width or the specific length-width ratio shall be selected. If the length-width ratio is excessively large, the fibers are prone to agglomerate in the stirring process, so that the dispersing performance is poor, such that the rheological property of the pressure-bearing plugging slurry deteriorates; if the aspect ratio is too small, the traction and connection capability is poor, and the plugging requirement cannot be met.

According to the present disclosure, the filling material is prepared by mixing walnut shell and quartz sand according to a weight ratio of 1:(1-2); preferably, the filling material is prepared by mixing walnut shell and quartz sand according to a weight ratio of 1:(1-1.5).

According to the present disclosure, the particle size of the walnut shell is within a range of 1-10 mm, and the particle size of the quartz sand is within a range of 0.1-1 mm; preferably, the particle size of the walnut shell is within a range of 4-6 mm, and the particle size of the quartz sand is within a range of 0.4-0.6 mm; more preferably, the walnut shell have a particle size of 5 mm, and the quartz sand has a particle size of 0.5 mm.

In the present disclosure, the filling material mainly plays a role in filling the pressure-bearing plugging slurry, the pressure-bearing capacity of the stratum is improved mainly by taking advantage of high hardness of the filling material, and the walnut shell have higher friction force and expansibility, so that the quartz sand can be squeezed more and more tightly, the pressure-bearing capacity of the stratum can be further improved. In the present disclosure, the stratum pressure-bearing capacity can be improved by using the walnut shell and the quartz sand according to the aforesaid specific weight ratio and the walnut shell and the quartz sand having the specific particle sizes.

A second aspect of the present disclosure provides a pressure-bearing plugging slurry prepared with the aforementioned pressure-bearing plugging composition.

A third aspect of the present disclosure provides a method for preparing the aforementioned pressure-bearing plugging slurry, wherein the bentonite, the deformation material, the filling material and the modified bridging material are sequentially contacted with water under the stirring conditions.

According to a specific embodiment of the present disclosure, the preparation method of the pressure-bearing plugging slurry specifically comprises the following steps:

Adding tap water into an enamel measuring cup, then starting a stirrer for stirring, and adding bentonite, a deformation material (fiber), a filling material (a mixture of walnut shell and quartz sand) and a modified bridging material sequentially into the enamel measuring cup during the stirring process to obtain the pressure-bearing plugging slurry.

According to the present disclosure, the conditions of the contacting comprise: t the stirring speed is within a range of 500-1,500 rpm, the stirring time is 2-3 h, and the temperature is room temperature, wherein the room temperature in the present disclosure is 20-30° C.

The third aspect of the present disclosure provides an application of the aforementioned pressure-bearing plugging slurry in the well-drilling construction operations for the stratum containing development of the secondary cracks.

According to the present disclosure, the crack development degree of the secondary crack development stratum is crack development, the crack porosity is between 0.2% and 8.0%, the crack width is within a range of 3-14 mm, the crack probability is more than 0.3; it is preferable that the crack porosity is between 0.8% and 6.4% t, the crack width is within a range of 5-12 mm, and the crack probability is 0.3-0.8. In addition, it should be noted in the present disclosure that the crack probability is a parameter reflecting existence possibility of the cracks, and the establishment of the crack existence probability model can vividly and intuitively express the possible distribution and development conditions of the reservoir cracks in the three-dimensional space, and reveal the internal structure and distribution characteristics of the reservoir cracks.

According to a particularly preferred embodiment of the present disclosure, the method for preparing the pressure-bearing plugging slurry comprises the following steps:

deformation materials (short-fiber sepiolite fibers, polypropylene short fibers or modified plant fibers), wherein the length of the fibers was 15 mm, and the width of the fibers was 3 mm;

the filling materials were walnut shell and quartz sand, wherein the particle size of the walnut shell was 5 mm, and the particle size of the quartz sand was 0.5 mm;

the preparation of a modified bridging material included the following steps:

(1) the intelligent gel ZND-2 was crushed with a crusher to prepare spheres, and the spheres was then screened to obtain a core with the diameter of 2-4 mm;

(2) the melted paraffin liquid was poured on the whole outer surface of the spherical core obtained in the step (1) at the temperature of 50-60° C.;

(3) the limestone powder and adhesive epoxy resin were mixed, the mixture was adhered to the surface of the product obtained in the step (2), the mixture was subjected to baking and the baked mixture was sieved to obtain a modified bridging material with the diameter of 5-8 mm, specifically, the mixed powder of the limestone powder and the adhesive epoxy resin with the particle size of 0.7 μm was uniformly scattered on a tray, the spherical product obtained in the step (2) was placed on the tray to roll, such that the mixed powder was adhered to the surface of the spherical product, the spherical product was subjected to baking in a baking oven at the temperature of 30-35° C. for 5 h, the spherical product was taken out, and the dried spherical product was sieved to prepare particles with the particle size of 5-8 mm, namely the modified bridging material JQ;

the prepared modified bridging material JQ comprised a core, and a coating layer coated on the outer surface of the core, and a paraffin layer disposed between the core and the coating layer; wherein the material of the core was intelligent gel ZND-2, the diameter of the core was 2-4 mm, the thickness of the paraffin layer was 0.2-0.4 mm, and the thickness of the coating layer was 2.8-3.6 mm;

wherein the coating layer was limestone powder with the particle size of 03 μm;

wherein the particle size of the modified bridging material was 5-8 mm;

preparation of the pressure-bearing plugging slurry included the following steps:

100 g of tap water was added into an enamel measuring cup, a stirrer was started, the stirring speed was adjusted to 1,000 rpm and the temperature was adjusted to 20° C., and then 3-6 g of bentonite, 0.4-0.6 g of fibers, 12-14 g of filling materials (consisting of 5-7 g of walnut shell and 6-8 g of quartz sand, wherein the weight ratio of the walnut shell to the quartz sand is 1:1-1.5) and 7-10 g of modified bridging material JQ were added into the enamel measuring cup sequentially, and subjected to stirring for 2-3 hours to prepare the pressure-bearing leakage-blocking slurry.

The present disclosure will be described in detail below with reference to examples.

In the following examples and comparative examples:

The bentonite was purchased from Lingshou Jinyuan Mining Processing Plant;

The fiber was purchased from Shijiazhuang Mayue Building Material Co., Ltd.;

The walnut shell was the common walnut purchased from supermarket, and the shell was ground and sieved to obtain the walnut shell;

The quartz sand was purchased from Chengdu Jinxiang Technology Co., Ltd.;

The limestone powder was purchased from Lingshou Jinyuan Mining Processing Plant;

The epoxy resins were purchased from Chengdu Kelong Chemical Co., Ltd.;

The paraffin was purchased from Chengdu Huoda Chemical Co., Ltd.;

The gel was specifically intelligent gel ZND-2 purchased from Sichuan Guangya Polymer Chemical Co., Ltd.

Plugging material experimental apparatus QD-2, cartridge capacity: 4,000 mL, gas source: nitrogen gas, working pressure: (1,000±10) psi, gap plate specification: numbers 1-6 (wherein number 6 refers to a full diameter ring), the measured plugging depth: 0-77 mm, external dimensions: 40 cm×40 cm×105 cm, weight: 90 kg, purchased from Qingdao Hengtaida Electromechanical Equipment Co., Ltd.

Example 1

The example served to illustrate the pressure-bearing plugging slurries prepared in the present disclosure.

(I) Preparation of the Materials:

The deformation material was short-fiber sepiolite fiber, the length of the fiber was 15 mm, and the width of the fiber was 3 mm;

The filling materials were walnut shell and quartz sand, wherein the particle size of the walnut shell was 5 mm, and the particle size of the quartz sand was 0.5 mm;

(II) The preparation of a modified bridging material included the following steps: (1) the gel was crushed with a crusher to prepare spheres, and the spheres was then screened to obtain a core with the diameter of 3 mm;

(2) the melted paraffin liquid was poured on the whole outer surface of the spherical core obtained in the step (1) at the temperature of 50° C.;

(3) the limestone powder and adhesive epoxy resin were mixed, the mixture was adhered to the surface of the product obtained in the step (2), the mixture was subjected to baking and the baked mixture was sieved to obtain a modified bridging material with the diameter of 7 mm, specifically, the mixed powder of the limestone powder and the adhesive epoxy resin with the particle size of 0.7 μm was uniformly scattered on a tray, the spherical product obtained in the step (2) was placed on the tray to roll, such that the mixed powder was adhered to the surface of the spherical product, the spherical product was subjected to baking in a baking oven at the temperature of 35° C. for 5 h, the spherical product was taken out, and the dried spherical product was sieved to prepare particles with the particle size of 7 mm, namely the modified bridging material JQ1.

The prepared modified bridging material JQ1 comprised a core, and a coating layer coated on the outer surface of the core, and a paraffin layer disposed between the core and the coating layer; wherein the material of the core was intelligent gel ZND-2, the diameter of the core was 3 mm, the thickness of the paraffin layer was 0.3 mm, and the thickness of the coating layer was 3.2 mm;

wherein the coating layer was limestone powder with the particle size of 0.7 μm;

wherein the particle size of the modified bridging material was 6.5 mm.

(III) Preparation of the pressure-bearing plugging slurry included the following steps:

100 g of tap water was added into an enamel measuring cup, a stirrer was started, the stirring speed was adjusted to 1,000 rpm and the temperature was adjusted to 20° C., and then 4 g of bentonite, 0.5 g of deformation material short-fiber sepiolite fiber, 5 g of walnut shell, 8 g of quartz sand and 8 g of modified bridging material JQ1 were sequentially added into the enamel measuring cup, and subjected to stirring for 2 hours to prepare the pressure-bearing leakage-blocking slurry A1.

Example 2

The example served to illustrate the pressure-bearing plugging slurries prepared in the present disclosure.

Preparation of the Materials:

The deformation material was polypropylene short fiber, the length of the fiber was 15 mm, and the width of the fiber was 3 mm;

The filling materials were walnut shell and quartz sand, wherein the particle size of the walnut shell was 5 mm, and the particle size of the quartz sand was 0.5 mm;

The same modified bridging material JQ1 as in Example 1 was used.

Preparation of the pressure-bearing plugging slurry included the following steps:

100 g of tap water was added into an enamel measuring cup, a stirrer was started, the stirring speed was adjusted to 1,000 rpm and the temperature was adjusted to 25° C., then 3 g of bentonite, 0.4 g of deformation material polypropylene short fiber, 6 g of walnut shell, 6 g of quartz sand and 7 g of modified bridging material JQ1 were sequentially added into the enamel measuring cup, and subjected to stirring for 2.5 hours to prepare the pressure-bearing leakage-blocking slurry A2.

Example 3

The example served to illustrate the pressure-bearing plugging slurries prepared in the present disclosure.

Preparing Materials:

The deformation material was modified plant fiber, the length of the fiber was 15 mm, and the width of the fiber was 3 mm;

The filling materials were walnut shell and quartz sand, wherein the particle size of the walnut shell was 5 mm, and the particle size of the quartz sand was 0.5 mm;

The same modified bridging material JQ1 as in Example 1 was used.

Preparation of the pressure-bearing plugging slurry included the following steps:

100 g of tap water was added into an enamel measuring cup, a stirrer was started, the stirring speed was adjusted to 1,000 rpm and the temperature was adjusted to 30° C., then 5 g of bentonite, 0.6 g of deformation material modified plant fiber, 7 g of walnut shell, 7 g of quartz sand and 9 g of modified bridging material JQ1 were sequentially added into the enamel measuring cup, and subjected to stirring for 3 hours to prepare the pressure-bearing leakage-blocking slurry A3.

Example 4

The example served to illustrate the pressure-bearing plugging slurries prepared in the present disclosure.

The pressure-bearing plugging slurry A4 was prepared with the same method as in Example 1, except that in the process of preparing the modified bridging material in the step (II), the preparation of the modified bridging material JQ2 included the following steps:

(1) the gel was crushed with a crusher to prepare spheres, and the spheres was then screened to obtain a core with the diameter of 2 mm;

(2) the melted paraffin liquid was poured on the whole outer surface of the spherical core obtained in the step (1) at the temperature of 55° C.;

(3) the limestone powder and adhesive epoxy resin were mixed, the mixture was adhered to the surface of the product obtained in the step (2), the mixture was subjected to baking and the baked mixture was sieved to obtain a modified bridging material with the diameter of 5 mm, specifically, the mixed powder of the limestone powder and the adhesive epoxy resin with the particle size of 0.7 μm was uniformly scattered on a tray, the spherical product obtained in the step (2) was placed on the tray to roll, such that the mixed powder was adhered to the surface of the spherical product, the spherical product was subjected to baking in a baking oven at the temperature of 32.5° C. for 5 h, the spherical product was taken out, and the dried spherical product was sieved to prepare particles with the particle size of 5 mm, namely the modified bridging material JQ2.

In the modified bridging material JQ2, the diameter of the core was 2 mm, the thickness of the paraffin layer was 0.2 mm, and the thickness of the coating layer was 2.8 mm; the particle size of the modified bridging material was 5 mm.

The prepared pressure-bearing plugging slurry was denoted as A4.

Example 5

The example served to illustrate the pressure-bearing plugging slurries prepared in the present disclosure.

The pressure-bearing plugging slurry A6 was prepared with the same method as in Example 2, except that: "the modified bridging material JQ1" was replaced by "the modified bridging material JQ2".

The prepared pressure-bearing plugging slurry was denoted as A6.

Example 6

The example served to illustrate the pressure-bearing plugging slurries prepared in the present disclosure.

The pressure-bearing plugging slurry A7 was prepared with the same method as in Example 3, except that: "the modified bridging material JQ1" was replaced by "the modified bridging material JQ2".

The prepared pressure-bearing plugging slurry was denoted as A7.

Example 7

The example served to illustrate the pressure-bearing plugging slurries prepared in the present disclosure.

The pressure-bearing plugging slurry A5 was prepared with the same method as in Example 1, except that in the process of preparing the modified bridging material in the step (II), the preparation of the modified bridging material JQ3 included the following steps:

(1) the gel was crushed with a crusher to prepare spheres, and the spheres was then screened to obtain a core with the diameter of 4 mm;

(2) the melted paraffin liquid was poured on the whole outer surface of the spherical core obtained in the step (1) at the temperature of 60° C.;

(3) the limestone powder and adhesive epoxy resin were mixed, the mixture was adhered to the surface of the product obtained in the step (2), the mixture was subjected to baking and the baked mixture was sieved to obtain a modified bridging material with the diameter of 8 mm, specifically, the mixed powder of the limestone powder and the adhesive epoxy resin with the particle size of 0.7 μm was uniformly scattered on a tray, the spherical product obtained in the step (2) was placed on the tray to roll, such that the mixed powder was adhered to the surface of the spherical product, the spherical product was subjected to baking in a baking oven at the temperature of 30° C. for 5 h, the spherical product was taken out, and the dried spherical product was sieved to prepare particles with the particle size of 8 mm, namely the modified bridging material JQ3.

In the modified bridging material JQ3, the diameter of the core was 4 mm, the thickness of the paraffin layer was 0.4 mm, and the thickness of the coating layer was 3.6 mm; the particle size of the modified bridging material was 8 mm.

The prepared pressure-bearing plugging slurry was denoted as A5.

Example 8

The example served to illustrate the pressure-bearing plugging slurries prepared in the present disclosure.

The pressure-bearing plugging slurry A8 was prepared with the same method as in Example 2, except that: "the modified bridging material JQ1" was replaced by "the modified bridging material JQ3".

The prepared pressure-bearing plugging slurry was denoted as A8.

Example 9

The example served to illustrate the pressure-bearing plugging slurries prepared in the present disclosure.

The pressure-bearing plugging slurry A9 was prepared with the same method as in Example 3, except that: "the modified bridging material JQ1" was replaced by "the modified bridging material JQ3".

The prepared pressure-bearing plugging slurry was denoted as A9.

Example 10

The example served to illustrate the pressure-bearing plugging slurries prepared in the present disclosure.

The pressure-bearing plugging slurry A10 was prepared with the same method as in Example 1, except that in the preparation process of the pressure-bearing plugging slurry in the step (III), 2 g of bentonite, 0.6 g of deformation material short-fiber sepiolite fiber, 5 g of walnut shell, 5 g of quartz sand and 6 g of modified bridging material JQ1 were sequentially added.

The prepared pressure-bearing plugging slurry was denoted as A10.

Example 11

The example served to illustrate the pressure-bearing plugging slurries prepared in the present disclosure.

The pressure-bearing plugging slurry A11 was prepared with the same method as in Example 1, except that in the preparation process of the pressure-bearing plugging slurry in the step (III), 6 g of bentonite, 1 g of deformation material short-fiber sepiolite fiber, 8 g of walnut shell, 8 g of quartz sand and 10 g of modified bridging material JQ1 were sequentially added.

The prepared pressure-bearing plugging slurry was denoted as A11.

Example 12

The example served to illustrate the pressure-bearing plugging slurries prepared in the present disclosure.

The pressure-bearing plugging slurry A12 was prepared with the same method as in Example 4, except that in the preparation process of the pressure-bearing plugging slurry in the step (III), 2 g of bentonite, 0.6 g of deformation material short-fiber sepiolite fiber, 5 g of walnut shell, 5 g of quartz sand and 6 g of modified bridging material JQ2 were sequentially added.

The prepared pressure-bearing plugging slurry was denoted as A12.

Example 13

The example served to illustrate the pressure-bearing plugging slurries prepared in the present disclosure.

The pressure-bearing plugging slurry A13 was prepared with the same method as in Example 7, except that 2 g of bentonite, 0.6 g of deformation material short-fiber sepiolite fiber, 5 g of walnut shell, 5 g of quartz sand and 6 g of modified bridging material JQ3 were sequentially added.

The prepared pressure-bearing plugging slurry was denoted as A13.

Comparative Example 1

The pressure-bearing plugging slurry D1 was prepared with the same method as in Example 1, except that the modified bridging material was not added, and the prepared pressure-bearing plugging slurry was denoted as D1.

Comparative Example 2

The pressure-bearing plugging slurry D2 was prepared with the same method as in Example 1, except that the modified bridging material in Example 1 was replaced with "limestone powder" having a particle size of 7 mm, and the prepared pressure-bearing plugging slurry was denoted as D2.

Comparative Example 3

The pressure-bearing plugging slurry D3 was prepared with the same method as in Example 1, except that the deformation material fiber was not added, and the prepared pressure-bearing plugging slurry was denoted as D3.

Comparative Example 4

The pressure-bearing plugging slurry D4 was prepared with the same method as in Example 1, except that the quartz sand was not added, that is, the filling materials were completely composed of walnut shell, and the added amount of the walnut shell was 13 g, the prepared pressure-bearing plugging slurry was denoted as D4.

Comparative Example 5

The pressure-bearing plugging slurry D5 was prepared with the same method as in Example 1, except that 1 g of bentonite, 0.1 g of fiber, 2 g of walnut shell, 2 g of quartz sand and 2 g of modified bridging material were sequentially added into the enamel measuring cup to prepare the pressure-bearing plugging slurry D5.

Comparative Example 6

The pressure-bearing plugging slurry D6 was prepared with the same method as in Example 1, except that adding 7 g of bentonite, 2 g of fibers, 10 g of walnut shell, 10 g of quartz sand and 15 g of modified bridging materials were sequentially added into the enamel measuring cup to prepare the pressure-bearing plugging slurry D6.

Test Example

The plugging material experimental apparatus QD-2 was used and subjected to modification:

The pellets underneath the plugging material experimental apparatus QD-2 were removed, a stainless steel cylindrical seam plate was added, wherein the thickness of the cylindrical seam plate was 6 cm, a wedge-shaped seam with a length of 5 cm, a width of 1 cm and a depth of 6 cm was formed on the cylindrical seam plate, the internal part of the wedge-shaped seam was roughened by grinding to simulate a stratum crack, a heating sleeve was arranged outside the cylindrical seam plate for heating, and the temperature was raised to 120° C. prior to injection of the plugging slurry.

The experimental method comprised the following steps:

(1-1) The plugging slurries were prepared in advance according to the individual Example and Comparative example;

(1-2) the plugging slurry prepared in the step (1-1) was added into the experimental instrument, the leakage conditions of the plugging slurries were observed, and the leakage conditions such as the starting leaking time and the leakage amount of the drilling fluid were recorded;

(1-3) when there was not liquid flowing from the small opening in the lower part, it can be deemed that the crack had been plugged;

(1-4) the experimental instrument in the step (1-3) was pressurized with a nitrogen gas cylinder and the time was recorded. The pressure was increased from normal pressure to 0.5 MPa, the leakage condition was observed, if the leakage did not occur, the pressure was further increased to 1 MPa after 2 minutes, the leakage condition was observed, if the leakage did not occur, the pressurization process was continuously performed, and repeating the steps to increase the pressure to 6.0 MPa. If the leakage of the drilling fluid occurred during the pressurizing process, the leakage conditions were observed and recorded, until the leakage of the drilling fluid was stopped, the pressure was stabilized for 2 min, and the pressurization process was continuously implemented with a pressure rise amplitude of 0.5 MPa for each time until the pressure was increased to 6.0 MPa. The above stage was the plugging stage, if the drilling fluid was completely leaked during the pressurizing process, such a condition was denoted as breakdown under pressure, in the meanwhile, the leakage condition and the pressure when the breakdown occurred were recorded.

(1-5) relieving pressure, the cylindrical seam plate was taken out, the seam surface of the crack and the condition in the crack were observed and recorded;

(1-6) the surface of the cylindrical seam plate which was not pressed through in the step (1-5) was cleaned, the cylindrical seam plate was placed into an experimental instrument, the drilling fluid (a conventional sulfonated drilling fluid system) with the same volume as the plugging slurry in the step (1) was poured, and subjecting to pressurizing by using a nitrogen gas bottle to 6.0 MPa at a pressure rise rate of 0.5 MPa/2 min, the stage was a pressure-bearing stage, the leakage condition and the pressure when the breakdown occurred were observed and recorded.

(1-7) the instrument was subjected to cleaning, the data was disposed, an experimental result was analyzed and the experiment was finished.

The leakage stoppage effect and the pressure-bearing effect of the leakage stoppage slurry of each example and comparative example were tested according to the aforementioned experimental method, and the experimental data were shown in the leakage stoppage effect and the pressure-bearing effect of the plugging slurries in the Table 1.

TABLE 1

| Experimental groups | Leaking stoppage stage | | Pressure-bearing stage | |
|---|---|---|---|---|
| | Breakdown pressure/ MPa | Leakage amount/ mL | Breakdown pressure/ MPa | Leakage amount/ mL |
| A1 | — | 2 | — | 0 |
| A2 | — | 3 | — | 0 |
| A3 | — | 2 | — | 0 |
| A4 | — | 4 | — | 0 |
| A5 | — | 4 | — | 0 |
| A6 | — | 6 | — | 0 |
| A7 | — | 4 | — | 0 |
| A8 | — | 7 | — | 0 |
| A9 | — | 8 | — | 0 |
| A10 | — | 9 | — | 0 |
| A11 | — | 10 | — | 0 |
| A12 | — | 11 | — | 0 |
| A13 | — | 13 | — | 0 |
| D1 | 4.5 | Leaked completely | Not done | Not done |
| D2 | — | 10 | 2.5 | Leaked completely |
| D3 | 4 | Leaked completely | Not done | Not done |
| D4 | — | 8 | 4 | Leaked completely |
| D5 | 2.5 | Leaked completely | Not done | Not done |
| D6 | — | 11 | 5 | Leaked completely |

Note:
"Not done" refers to that the pressure-bearing test is not done because the sample has been broken down under pressure.
"—" refers to that the sample is not broken down, which shows that the plugging filling layer formed by the pressure-bearing plugging slurry in a leaking stoppage stage has a high strength, the pressure-bearing capacity of a stratum is effectively improved, and the pressure-bearing and leaking stoppage effects are excellent.

As illustrated by the data in Table 1, each of the pressure-bearing plugging slurries of the experimental group A1-13 is not broken down in the plugging stage, and all the pressure-bearing plugging slurries successfully plug the cracks after the leakage loss of the pressure-bearing plugging slurries is not more than 13 mL, and the samples of examples 1-13 are not broken down in the subsequent pressure-bearing stage, it indicates that the plugging filling layer formed in the plugging stage has high strength, thereby improving the pressure-bearing capability of the stratum; in addition, when the cylindrical seam plate of the samples of Examples 1-13 is detached, and the filler in the crack is subjected to needling, the filler is found to be very dense and cannot be easily cleaned out from the cracks, i.e. the cracks are substantially eliminated. Moreover, in terms of the Example 2 and Example 3, the effects of Example 3 are more excellent because the treating agents are added in a larger amount in Example 3. The modified bridge materials of Example 4 and Example 7 have different particle sizes. However, Example 4 and Example 7 shall have the comparative effects in terms of the 10 mm crack simulation evaluation device.

In regard to the pressure-bearing plugging slurry D1, because the modified bridging material is not added, only a plugging layer is formed on the surface of the crack in the plugging stage, when the applied pressure is increased to 4.5 MPa, the plugging layer is broken through, which shows that the strength of the generated plugging layer is insufficient, thus the subsequent pressure-bearing experiment is not carried out on the plugging layer.

With regard to the pressure-bearing plugging slurry D2, the modified bridging material is replaced by the rigid particle limestone powder, and the particle size of the limestone powder is 7 mm, in the plugging stage, the rigid particle limestone powder only plays a bridging role in the cracks, the powder in combination with the filling material can form a plugging layer with ordinary strength on the crack, such that the plugging is successfully performed. However, given that the formed filling layer has insufficient strength, it can be easily broken through during the pressure-bearing stage, the experimental result demonstrates the problem "leakage after the plugging operation, and further plugging is required after the leakage" mentioned in the background art.

In regard to the pressure-bearing plugging slurry D3, the formed filling layer is easy to be broken down due to its lack of the traction connection effect of the fibers, and the pressure bearing experiment is not done due to the broken-down of the filling layer.

With regard to the pressure-bearing plugging slurry D4, because the filling material is only consisting of walnut shell and does not contain quartz sand having smaller grain diameter, the formed filling layer has insufficient strength, such that the filling layer is broken down in the pressure-bearing stage.

With respect to the pressure-bearing plugging slurry D5, given that the content of bentonite, a deformation material, a filling material and a modified bridging material in the pressure-bearing plugging slurry is excessively low, the plugging slurry only forms a filling layer on the surface of a crack during the plugging stage, when a pressure of 2.5 MPa is applied, the filling layer is broken down, the strength of the generated filling layer is excessively low, thus a subsequent pressure-bearing experiment is not carried out on the filling layer.

With respect to the pressure-bearing plugging slurry D6, because the content of bentonite, a deformation material, a filling material and a modified bridging material in the pressure-bearing plugging slurry is excessively high, an effective synergistic effect among the materials is not formed, so that the formed filling layer has insufficient strength, the formed filling layer is broken down in a pressure-bearing stage.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:
1. A pressure-bearing plugging composition comprising bentonite, a deformation material, a filling material, a modified bridging material and water, wherein
the bentonite is contained in an amount of 1-7 parts by weight,
the deformation material is contained in an amount of 0.1-1.5 parts by weight, wherein the deformation material is a fiber,
the filling material is contained in an amount of 8-18 parts by weight, wherein the filling material is prepared by mixing walnut shell and quartz sand according to a weight ratio of 1:(1-2), and
the modified bridging material is contained in an amount of 4-12 parts by weight, based on 100 parts by weight of water;

wherein the modified bridging material comprises a core, and a coating layer coated on an outer surface of the core, and a paraffin layer disposed between the core and the coating layer;

wherein the core is made of a water-absorbing material, and the coating layer is formed by bonding rigid particles and an adhesive.

2. The composition of claim 1, wherein the bentonite is contained in an amount of 2-6 parts by weight, the deformation material is contained in an amount of 0.1-1 parts by weight, the filling material is contained in an amount of 10-16 parts by weight, and the modified bridging material is contained in an amount of 6-10 parts by weight, based on 100 parts by weight of water.

3. The composition of claim 1, wherein the modified bridge material is prepared by a method including:
  (1) subjecting the water-absorbing material to a spheroidization process to obtain a core;
  (2) coating at least a part of an outer surface of the core with paraffin to obtain a paraffin layer;
  (3) adhering a bonded mixed powder to at least a part of an outer surface of the paraffin layer and subjecting to a baking treatment, wherein the bonded mixed powder comprises rigid particles and an adhesive, thereby obtaining the modified bridging material.

4. The composition of claim 3, wherein the water-absorbing material comprises rubber and/or gel; the rigid particles are one or more selected from the group consisting of limestone, walnut shell, quartz sand, calcite and sawdust, and the rigid particles have a particle size within a range of 0.5-0.9 µm; and the adhesive is one or more selected from the group consisting of epoxy resin, phenolic resin, unsaturated polyester and polyurethane.

5. The composition of claim 4, wherein the walnut shell has a particle size of 1-10 mm, and the quartz sand has a particle size of 0.1-1 mm.

6. The composition of claim 3, wherein the conditions of the baking treatment in the step (3) comprise: a temperature within a range of 30–40° C., and a time of 4-6 h.

7. The composition of claim 1, wherein the core has a particle size within a range of 1-5 mm, the paraffin layer has a thickness of 0.1-0.6 mm, and the coating layer has a thickness of 1.9-4.4 mm.

8. The composition of claim 7, wherein the core has a particle size within a range of 2-4 mm, the paraffin layer has a thickness of 0.2-0.4 mm, and the coating layer has a thickness of 2.8-3.6 mm.

9. The composition of claim 1, wherein the deformation material is a fiber having a length of 10-20 mm and a width of 1-5 mm.

10. A pressure-bearing plugging slurry prepared with the pressure-bearing plugging composition of claim 1.

11. A method for preparing the pressure-bearing plugging slurry of claim 10 comprising contacting bentonite, deformation material, filling material and modified bridging material with water under stirring conditions.

12. The method of claim 11, wherein the conditions of the contacting comprise: the stirring speed is within a range of 500-1,500 rpm, the stirring time is 2-3 h, and the temperature is 20-30° C.

\* \* \* \* \*